United States Patent [19]

Garrec

[11] Patent Number: 5,444,348

[45] Date of Patent: Aug. 22, 1995

[54] ELECTRIC JACK HAVING A ROTATION-TRANSLATION MOVEMENT CONVERSION SYSTEM AND WITH ENERGY RECOVERY

[75] Inventor: Philippe Garrec, Paris, France

[73] Assignee: Commissariat a l'Energie Atomique, Paris, France

[21] Appl. No.: 162,064

[22] PCT Filed: Jul. 3, 1992

[86] PCT No.: PCT/FR92/00633

§ 371 Date: Dec. 9, 1993

§ 102(e) Date: Dec. 9, 1993

[87] PCT Pub. No.: WO93/01652

PCT Pub. Date: Jan. 21, 1993

[30] Foreign Application Priority Data

Jul. 3, 1991 [FR] France .................. 91 08310

[51] Int. Cl.$^6$ .............................................. B66F 3/22
[52] U.S. Cl. .................... 318/640; 318/560; 74/424.8 R; 414/462; 254/126; 254/8 B
[58] Field of Search .................. 318/560–649, 318/811, 801, 135, 376, 379, 139, 375, 759, 245, 370, 393, 807, 696; 310/76, 80, 83, 78, 12, 14, 13, 328; 210/159; 74/424.8 R, 89.15, 89.22, 411; 388/806, 493; 254/93 H, 1, 93 M, 102, 103, DIG. 2, 425, 424, 423, 419, 122, 126, 103

[56] References Cited

U.S. PATENT DOCUMENTS

| 3,671,826 | 6/1972 | Newell | 318/138 |
|---|---|---|---|
| 3,844,535 | 10/1974 | Dorough | 254/103 |
| 3,997,143 | 12/1976 | Rose | 254/86 R |
| 4,025,859 | 5/1977 | Smith | 318/696 |
| 4,067,543 | 1/1978 | Orth et al. | 254/86 R |
| 4,467,250 | 8/1984 | Thomasson | 318/436 |
| 4,496,865 | 1/1985 | Allen et al. | 310/80 |
| 4,547,692 | 10/1985 | Spaulding | 318/592 |
| 4,712,027 | 12/1987 | Karidis | 318/135 X |
| 4,733,146 | 3/1988 | Hamby | 318/393 |
| 4,969,631 | 11/1990 | Whittingham | 254/425 |
| 5,041,748 | 8/1991 | Huber | 310/80 |
| 5,075,610 | 12/1991 | Harris | 318/701 |
| 5,099,161 | 3/1992 | Wolfbauer | 310/80 |
| 5,115,181 | 5/1992 | Sood | 318/701 |
| 5,118,082 | 6/1992 | Byun | 254/102 |
| 5,223,779 | 6/1993 | Palaniapan | 318/701 |
| 5,262,706 | 11/1993 | Hollingsworth | 318/560 |
| 5,294,874 | 3/1994 | Hessenberger | 318/759 |

Primary Examiner—Paul Ip

[57] ABSTRACT

An electric jack of the type used in robotics having a rotation-translation movement transformation system, at least one electric motor connected to the movement transformation system, means for controlling the electric motor for driving the movement transformation system with acceleration and deceleration phases and energy recovery means for recovering electrical energy generated by the electric motor during deceleration phases. The movement transformation system has a rotation part and a translation part and is mechanically reversible such that, during deceleration phases, the translation part is capable of driving the rotation part with substantially identical efficiency as the rotation part drives the translation part during acceleration phases. During deceleration phases, the kinetic energy of the translation part causes the electric motor to generate energy which is recovered and stored in an energy recovery system utilizing a capacitor and a diode.

17 Claims, 4 Drawing Sheets

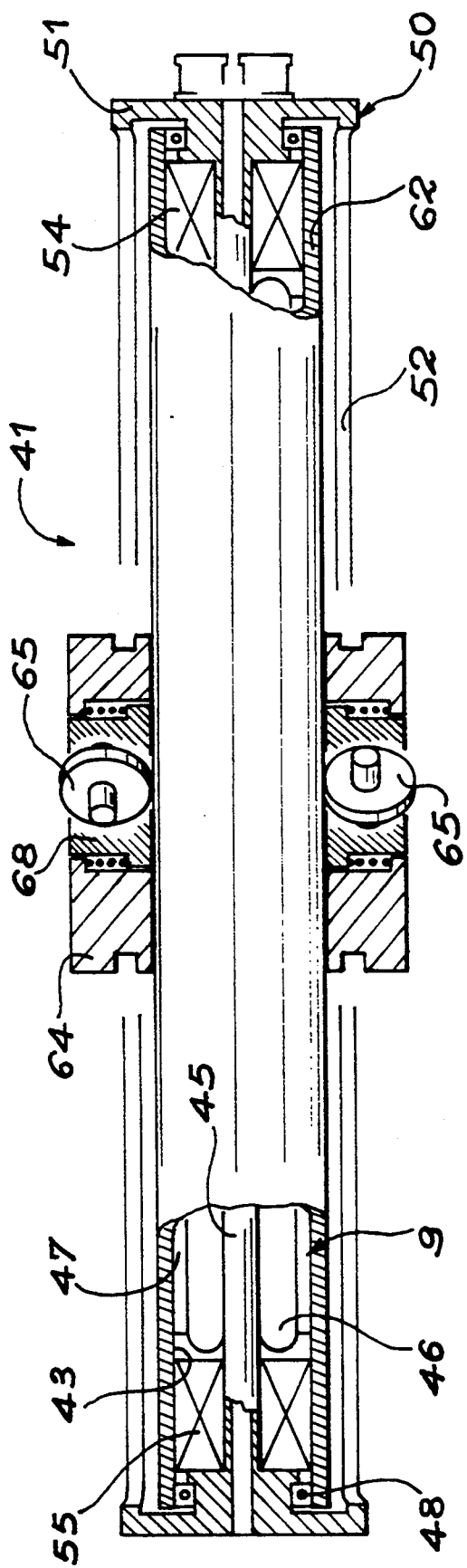
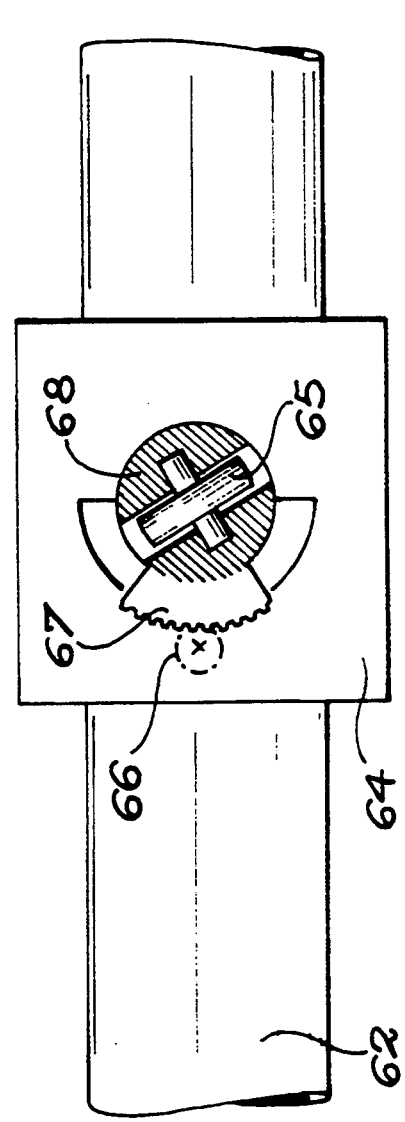
FIG. 5A
FIG. 5B

ELECTRIC JACK HAVING A ROTATION-TRANSLATION MOVEMENT CONVERSION SYSTEM AND WITH ENERGY RECOVERY

BACKGROUND OF THE INVENTION

The invention relates in general terms to the field of robotics, where jacks are used for bringing about reciprocal movement of the articulated elements or for the linear displacement of charges or loads, such as the arms or limbs of a robot. A first main application is for autonomous robots of the walking type or the type having a dynamically controlled suspension. The invention more specifically relates to an electric jack with a rotation-translation movement conversion system and with energy recovery, e.g. of the ball nut-screw type.

DESCRIPTION OF THE PRIOR ART

Among the motor elements used for the actuation of robots, reference can be made to hydraulic and electric jacks. Ever increasing interest is being attached to electric jacks, because hydraulic jacks require a large number of accessories for their operation and cause certain disadvantages due to the use of fluids as transmission elements.

Among the electric jacks, use is made of linear motors, which have an excessively low force/weight ratio to be frequently used in the construction of machines. In addition, they frequently have a limited efficiency.

Use has also been made for a significant time of the screw/nut system for transforming a mechanical rotation energy supplied by an electric motor into a mechanical translation energy. As the screw/nut system is very old, numerous improvements have already been made to it. Thus, numerous electric jacks operate with a ball nut/screw system, i.e. the nut is mounted on the screw by means of balls, somewhat in the same way as the outer ring of a ballbearing mounted on the inner ring by means of a few balls. The latter are located in one or more threads of the screw and are maintained within the nut.

With electric jacks using the ball nut/screw system, it is consequently possible to supply a translation movement with a given force, whereby the electric motor can be automatically controlled as a function of the position of the nut or the force to be supplied. However, in such a ball nut-screw system, the angle of inclination of the thread of the screw is limited in order to enable the jack to supply an adequate force, This arrangement limits the translation speed of the nut and suffers from the supplementary disadvantage of not being or only being slightly mechanically reversible. Thus, by rotating a screw having a limited thread inclination angle, it is easy to displace the nut which is screwed thereto. However, it is generally very difficult or even impossible to turn the screw by pushing or pulling the nut. However, such jacks are used for the displacement of relatively large loads to which the nut is connected. When the latter has reached its maximum speed on the screw during the operation of the jack, it has also acquired an often considerable kinetic energy more particularly due to the load which it is moving. Therefore the irreversibility of the small angle nut/screw system prevents the restoration to the screw of the kinetic energy stored by the load/nut system, when the screw is no longer moving the nut.

The aim of the invention is to propose a jack, e.g. of the ball nut-screw type, in which part of the mechanical energy imparted to the nut is recovered.

SUMMARY OF THE INVENTION

To this end, the main object of the invention is an electric jack mainly comprising at least one rotary electric motor rotating a rotation-translation movement transformation system in order to translate a translation part such as a nut with acceleration and deceleration phases and motor control means for driving the movement transformation system.

According to the invention, it comprises energy recovery means to enable the motor to recover, during the deceleration phases, part of the mechanical energy accumulated on the translation part during the acceleration phases.

When the rotation-translation movement transformation system is a ball nut-screw system, the screw has an angle with an adequate pitch (e.g. exceeding 5°) to permit energy recovery.

Preferably, the screw has several threads. In the main embodiment of the invention, use is made of a plurality N of rotary electric motors for driving the screw-nut system by means of the same power distributed over the N motors, so as to reduce the energy losses by the Joule effect during the transient phases (acceleration and braking).

The jack is particularly effective when use is made of autosynchronous alternating motors with at least one angular transducer or resolver mounted on the screw. In this case, the stator armatures are preferably connected in parallel.

In the screw-nut system, it is preferable to have a linear guidance part connected to the nut by a floating connection between the screw and the nut.

According to a feature of the invention, it is of interest to use an energy recovery system comprising a first non-return diode on the supply line, at least one capacitor connected to the electric energy source for storing the electric energy supplied by the motor during the generating phases and a power stage of the four quadrant type in the control means in order to permit said energy recovery.

Advantageously said system is completed by a second diode connected in series with the capacitor on the electric supply and controlled by a switch placed in the control means in order to control the discharge of the capacitor.

In a first main embodiment of the jack, the screw is rotated by the motor.

In a second main embodiment of the jack, the screw is fixed and the motor is placed around the nut rotating the latter.

In a third embodiment, the screw is again rotated by the motor, but in this case the screw is hollow and the motors are placed within said screw, the stators being central and fixed to a central tube. In this latter case, there can be a cooling fluid circulation within the central tube.

The jack can be surrounded by a cylindrical casing with openings through which is guided the nut or is locked in rotation.

In a second construction, the movement transformation system is a bearing using inclined ballbearings.

In a third construction the movement transformation system is a bearing having inclined rollers rubbing by bearing on a smooth rotary shaft and whose inclination can be regulated.

BRIEF DESCRIPTION OF THE DRAWINGS

The invention is described in greater detail hereinafter relative to non-limitative embodiments and with reference to the attached drawings, wherein show:

FIGS. 5A and 5B A fourth mechanical construction of the jack according to the invention.

DESCRIPTION OF THE PREFERRED EMBODIMENTS

Figure 1:
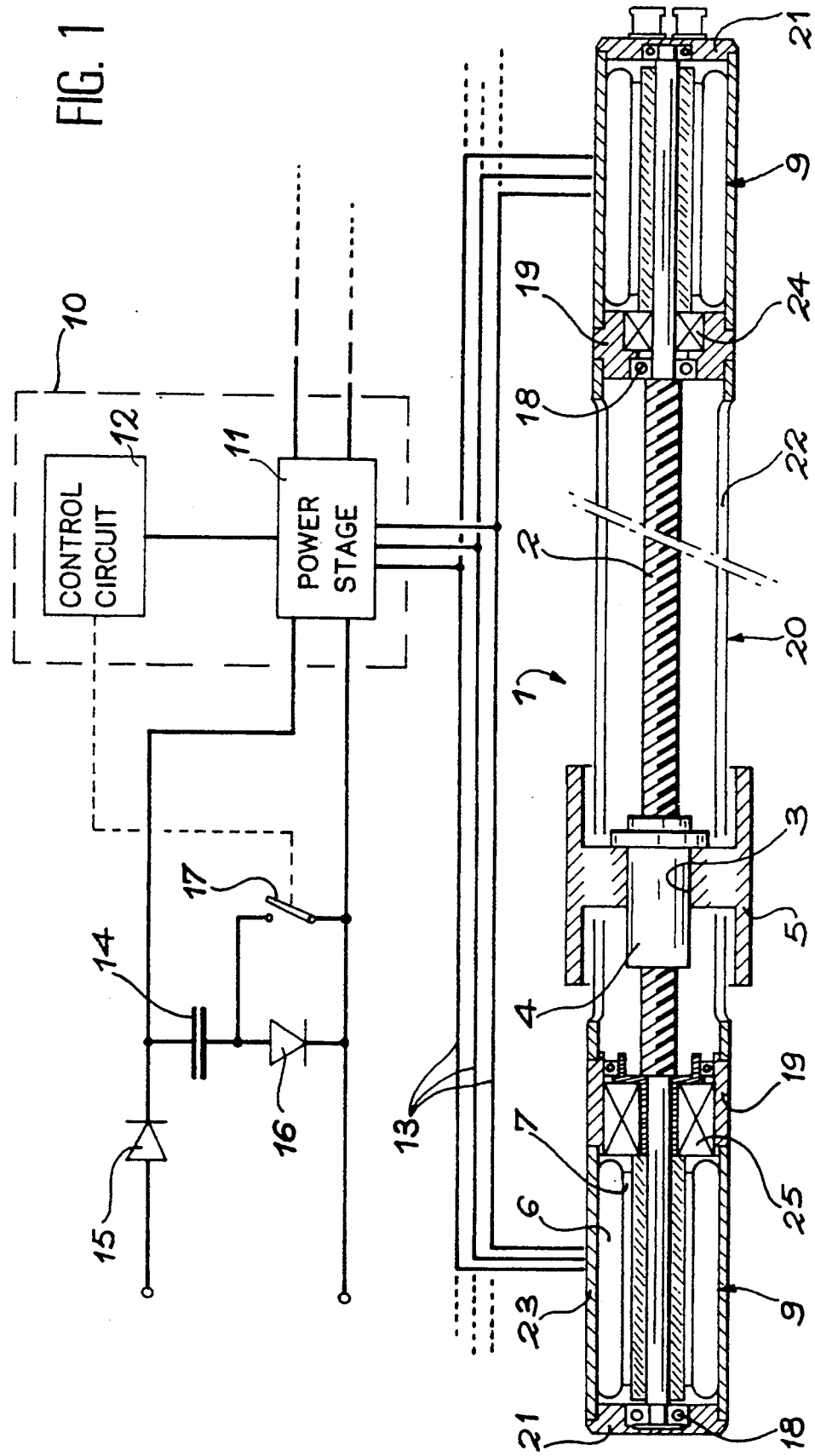
FIG. 1 The jack according to the invention with its energy recovery and control circuit.

FIG. 1 shows a first embodiment of a jack 1 associated with its control means 10. The jack 1 used in this embodiment mainly comprises a screw 2-nut 4 system, with two motors 9 rotating the screw 2. The nut 4 constitutes the translation part and is locked in rotation by means of a guiding part 5 to which it is fixed and sliding in an opening 22 of a casing 20 of the jack 1.

The screw 2 is mounted in rotary manner in two end flanges 21 by means of ballbearings 18. It is also mounted so as to rotate with respect to intermediate rings 19 by means of other ballbearings 18. Between the intermediate rings 19 and the end flanges 21 is placed at least one rotary electric motor 9. Each motor 9 has a stator armature fixed to a motor casing 23 and a rotary magnet 7 fixed to the screw 2. The motors 9 are placed at the ends of the screw 2, although this is a non-limitative exemplified embodiment.

A casing 20 is provided around the screw 2 in order to connect the two end flanges 21 of the jack containing the motors. This casing has a longitudinal opening 20 through which passes the guiding part 5 which is connected to the nut 4, so that the mechanical assembly is given an autonomous character, so as to permit easy, intergratable use.

According to the invention, use is made of means for the recovery of the energy imparted to the translation part, i.e. the screw 2. In the case of the screw/nut system, the screw 2 is a ball or roller screw having a large lead angle, i.e. exceeding 5°. Reference can be made to a very wide pitch angle range and an angle of 60° can be envisaged. However, in an already tested construction, the pitch angle is 32°5′.

It is clear that this arrangement permits a rapid displacement speed of the assembly of the nut 4 and the guiding part 5, but also and in particular permits the mechanical reversibility phenomenon of the screw 2/nut 4 system, as explained in the paragraphs relating to the prior art and the set problem. Thus, a large pitch angle makes it possible to obtain identical energy conversion efficiencies in both directions, namely rotation-translation and translation-rotation of approximately 0.85 to 0.90. It should also be noted that the typical rigidity of an e.g. ball screw makes it possible to obtain on the part of the motor means and their electric power supply a high cut-off frequency.

It is clear that if a large load is joined to the guiding part 5, which is itself connected to the nut 4 during its translation along the screw 2, when it reaches its maximum speed said assembly has acquired a high kinetic energy as a result of its weight and its speed and in this connection reference should be made to the formula $E = M \cdot V^2 / 2$.

Therefore there is a great interest in attempting to recover most of this energy in order to use it subsequently or restore it in electrical form to the power supply mains. The reversibility of the nut-screw system with a large pitch angle enables the nut 4 and its load to restore said energy on the flanks of the threads of the screw with an acceptable efficiency. Therefore, during the deceleration phases of the nut 4 and its load, the screw which exerts a braking action on said assembly is rotated with a torque making it possible to drive the rotary electric motor 9 serving as an electricity generator. The current received by the motors 9 can be restored to the power supply of the mains, or to other motors of one or more other jacks in operation at this precise time. Finally, said electric energy can be stored by one or more capacitors.

It is clear that the energy gain supplied by the reversibility of the mechanical system used offers a considerable advantage to such an electric jack using a nut-screw system with a large pitch angle. The disadvantage supplied by this large pitch angle, namely the larger the angle the smaller the force of the jack, can be compensated by multiplying the number of motors 9. It is for this reason that in the construction according to FIG. 1, two motors 9 are shown at each end of the ball screw 2, which makes it possible to reduce the intensity of the electric current on starting up compared with the use of a single rotary electric motor 9. Thus, the torque to be supplied is divided by two on each motor, so that the current I to be supplied to each of the motors will also be divided by two. However, it is known that rotary electric motors dissipate a large amount of energy as heat by the Joule effect during transient phases and in particular during starting up and acceleration. The energy lost is equal to $W = R \cdot I^2 \cdot T$. In the present case, the current to be supplied to each of the motors is divided by two, so that the energy dissipated by a motor will be divided by four. Therefore the use of two rotary electric motors in place of one will lead to a twice smaller heat dissipation during the transient phases than a single rotary electric motor for the same given torque. It is obviously possible to increase the number of motors, e.g. two at each end of the screw 2. In general terms, the losses will be divided by the same number of times as there are motors.

In the jack according to the invention use is preferably made of autosynchronous alternating motors. These motors operate particularly well under transient conditions, which is the application case with the jack according to the invention. Such motors require the presence of a resolver. The main constructions of the jack according to the invention have said resolver 24 coupled to one or more motors 9. In the present embodiment, it is placed between the right-hand motor and the bearing 8 joined to it.

Between the translation part formed by the nut 4 and the guiding part 5 there is a floating connection 3. Thus, bearing in mind the technology used, i.e. the bearing of the nut 4 on the screw 2 by means of balls, this operation leads to very slight oscillations of the nut during its displacements, i.e. a certain instability with respect to the axis of the screw 2. In view of the fact that the guiding part 5 must have a fixed position with respect to said axis, it is necessary to provide the aforementioned floating connection 3. The latter can be constituted by any random radial or axial coupling. Thus, it is possible to envisage a universal joint duplicated by an OLDHAM-type coupling.

In the embodiment of FIG. 1 a brake 25 is also positioned alongside the right-hand motor 9 and serves to lock the ball screw 2 in the case where there is a current loss during the manipulation of a suspended heavy load. This brake 25 will prevent an inopportune redescent of the load and therefore the nut 4, which could lead to damage to the jack.

When there are several motors, it is preferable to connect in parallel the stator armatures 6 of said motors 9. This permits a regular distribution of the torques over all the motors and improves the energy regeneration.

The control means 10 of the jack 1 comprise a control unit 12 controlling a power stage 11. The latter is used for transmitting the energy supplied by the power supply. This apparatus can e.g. be constituted by a polyphase rectifier/wiggler. Within the framework of the recovery and storage of the electric energy by a capacitor 14, said power stage is of the "four quadrant" type in order to permit the control of the electric energy in both directions.

In the case where there is a recovery and then a storage of the recovered energy, use is therefore made of at least one capacitor 14 connected to the two terminals of the direct or rectified current source, in parallel on the supply line, of the power stage 11. Said capacitor acts as a buffer, in conjunction with a diode 15 positioned upstream in order to prevent current returns to the supply. Thus, part of the mechanical energy, during a deceleration phase of the nut 4, produces an electric energy in the form of a voltage at the terminals of the capacitor 14. It is therefore possible during the next acceleration of the jack 1 to use the electric charge stored by the capacitor 14 to supply the necessary energy for the motors 9.

When it is wished to deliberately trigger the discharge of the capacitor 14, it is possible to use a second diode 16 in series with the capacitor 14 for using a switch 17 located at the terminals of said second diode 16. The closing of the switch 17 makes it possible to control the discharge of the capacitor 14 to the power stage 11. The switch 17 is then controlled by the; control circuit 12. This option will preferably be used when the supply is the same for several jacks and the latter operate in a relatively random manner in time, the cause or current being of various types and of a random nature.

The capacitor 14 is preferably an industrial, high capacitance, electrolytic capacitor, e.g. a capacitor of 6800 $\mu F$, operating at between 280 and 350 V and able to store approximately 150 J in a volume of less than 1 l. This energy corresponds to a weight of 300 kg, braked by 1 m/s on stopping. It should also be noted that autosynchronous motors operate at relatively high speeds and function very well at about 300 V, said voltage being compatible with that of the above-described capacitor.

The embodiment described relative to FIG. 1 makes it possible to develop with a diameter 20 mm screw with a pitch angle of 32.5°, a static force of approximately 175 daN and a pulse force at least five times greater. The efficiency of the recovery and regeneration of energy is considered to be a minimum of 45%. The ball screw used enables the nut to reach a speed of 2 m/s.

Figure 2:
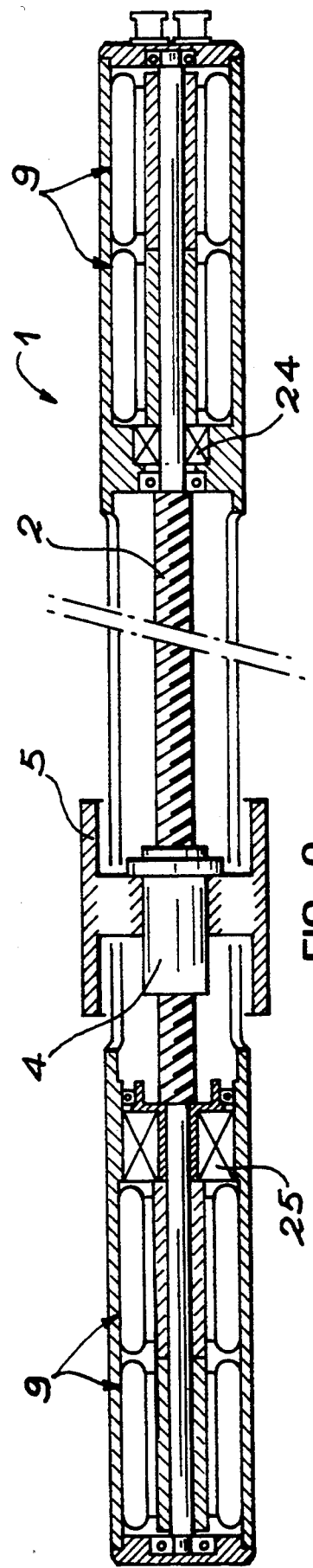
FIG. 2 A first mechanical construction of the jack according to the invention.

With reference to FIG. 2, it can be advantageous to have four motors 9 for a single jack 1. Preferably these motors 9 are arranged in pairs at each end of the screw 2. The forces obtained are clearly doubled. It is also pointed out that the efficiency of the energy recovery exceeds a minimum of 55%.

Thus, for a given diameter of the jack 1, it is possible to increase the available force without adding special external mechanical components and without changing the jack model. In general terms, if there are N motors 9 at each end, there are two N motors which distribute the total forces F and this applies in the same way to the armature currents. This division of the currents for each of the motors 9 having the same characteristics (constant K and resistance) leads to a considerable reduction in the power dissipated by the Joule effect. Thus, if I is the current necessary for supplying a single motor for supplying a given force F, I/N is the current necessary for each motor of a group of N motors intended to supply the same force F. However, the dissipation of the energy by the Joule effect in a motor is proportional to $(I/N)^2$. Consequently when N motors are used, the energy dissipation is $N \bullet (I^2/N^2)$. Thus, the dissipated energy is N times smaller than the energy dissipated by a single motor. As these losses essentially take place under transient conditions and the jack according to the invention is intended to operate in acceleration and deceleration, the energy saved by the use of N motors compared with an individual motor is considerable.

Figure 3:
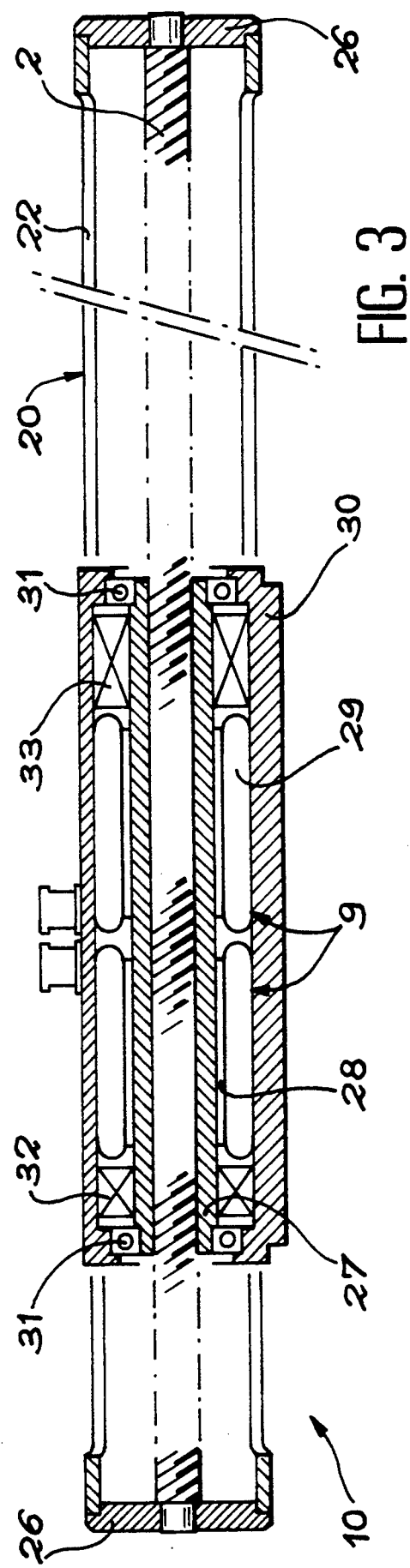
FIG. 3 A second mechanical construction of the jack according to the invention.

FIG. 3 shows a constructional variant relative to the fixing of the screw 2 in the end flanges 26 of the jack 1. In this case, the nut 27 is slightly longer and is surrounded by one or more motors 9, whereof the magnet 28 is fixed to the nut 27, whereas the stator armature 29 is fixed to a ring 30, which is locked in translation, e.g. in the opening 22 of the casing 20. Ballbearings 31 are placed at the ends of the nut 27 in order to permit its rotation with respect to the ring 30. Recesses can also be provided for the resolver 32 and the brake 33. The energy recovery principle, with or without electric energy storage in a capacitor, is the same as that used in the jack of the previous drawing.

Figure 4:
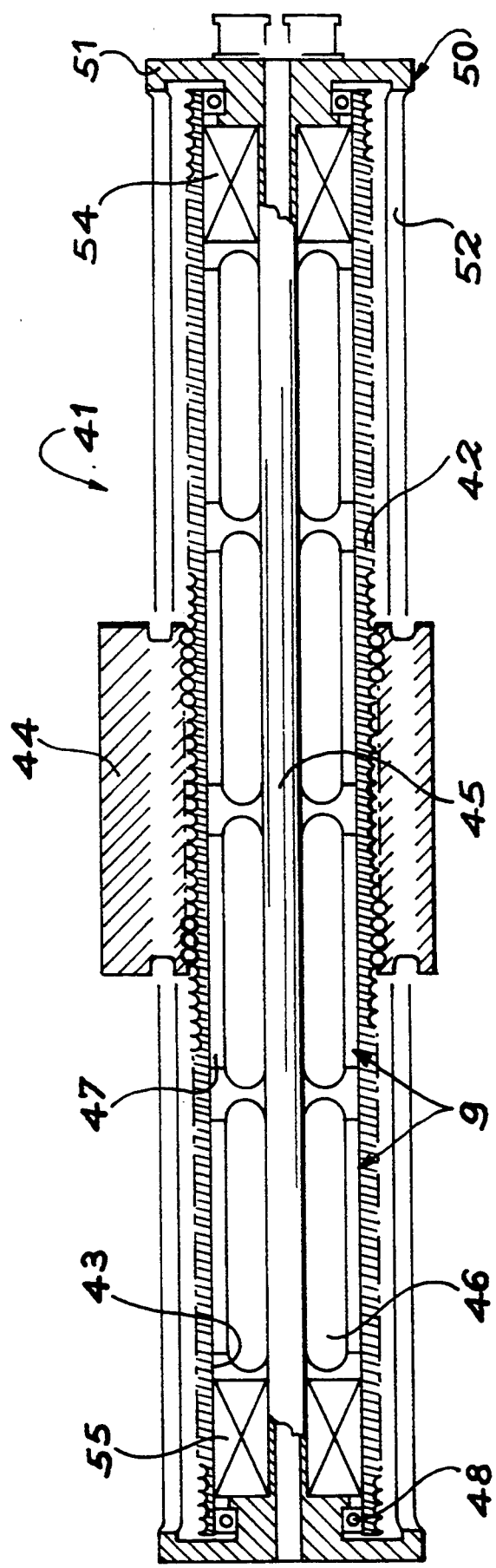
FIG. 4 A third mechanical construction of the jack according to the invention.

With reference to FIG. 4, a third variant provides for the use of a hollow screw 42 in a jack 41. In this case, the motors 9 are placed within said tubular screw 42. The magnets 47 are fixed to the inner wall 43 of the screw 42, whilst the stator armatures 46 are placed within magnets 47 and are fixed by their internal diameter to a fixed tube 45. Bearings 48 permit the rotation of the screw 42 around the tube 45. The nut 44 is mounted around the screw 42, but is locked in rotation in the opening 52 of the casing 50. At the ends, space can be provided for the housing of a brake 55 and a resolver 54.

In the embodiment according to FIG. 4, it is possible to place a maximum number of motors 9 within the screw 42. Thus, if a random use requires a jack with a maximum length of 1 m, most of the screw, i.e. 80 cm, can be used for housing motors. Moreover, the central tube 45 can permit the circulation of a cooling liquid, such as water, so as to make it possible to evacuate the heat given off by the stator armatures 46 of the motors 9. A supplementary advantage of this construction relates to the ballbearings 48, which have a larger diameter and therefore in theory a longer life.

It is also possible to envisage the use of mechanical jack types other than those using the screw of the nut system. Thus, a linear jack called "ROH'LIX", marketed in the USA by ZERO-MAX, a Barry WRIGHT company, uses rollers which roll by friction on a rotary smooth shaft. The rollers are inclined and make it possible to slide in the case of an overload.

An embodiment is shown in FIG. 5A (front section) and FIG. 5B (plan view). The bearing is constituted by a yoke 64 in which are mounted in rotary manner several rollers 65, in such a way that the inner envelope which they define corresponds to the outer surface of the smooth shaft 62. Their fitting can be obtained with a pivoting part 68 mounted so as to route in the yoke 64, perpendicular to the axis of the smooth shaft 62 and actuated by a motor 66 acting on a circular arc rack 67.

This case of using a conversion system by smooth shaft 62 and inclined pressing rollers 65 and a motorization included in the shaft 62 has further advantages. Thus, the idea of increasing the diameter of the screw so as to house therein the motorization (hollow screw) leads to high inertia ball nut-screw systems and which therefore absorb a high kinetic energy in pure loss in the acceleration phases. In this connection the system having a smooth shaft 62 and pressing rollers 65 can become more interesting than the ball screw system, because different technological constraints apply. Thus, it is easily possible to obtain a large diameter, small weight (inertia) smooth shaft, e.g. made from a light alloy or composite material, optionally surface hardened in order to withstand the high pressures applied by the rollers. The motors are then reversed and placed in the interior. The hollow smooth tube 62 is made from a lightweight material (light alloy or composite material of the carbon fibre type), which has been surface hardened (e.g. chromium deposit). The mobile system carrying the pressing roller 65 is translated concentrically to the tube 62. The inclination of the rollers 65 can be fixed or regulatable, optionally during the movement by means of a control system, so it is possible to change the pitch value.

A special application occurs with walking robots or dynamic suspensions of wheeled vehicles. The system makes it possible to adapt the characteristics of the actuator as a function of configurations: high forces, low speeds or low forces and fast alternating movements with a possibility of energy recovery. It is also possible to use roller nut/screw systems in place of the ball nut/screw system.

Another type of linear jack is marketed by AMA-COIL in the USA under the name "UHING LINEAR DRIVES". This device uses inclined ballbearings placed in a yoke and whose inner rings bear on the rotary smooth shaft.

The different types of mechanical systems referred to here for transforming a rotary movement into a translation movement only constitute examples. Claim 1 serves to protect the use of all types of transformation device for transforming a rotary movement into a translation movement associated with energy recovery when this is made possible.

The jack according to the invention leads to the following advantages:
compactness of the jack assembly,
number of moving mechanical parts reduced to a minimum,
no use of a reduction gear,
variable power for a given model as a function of the number of motors used,
no mechanical system is added,
the increase in the number of motors makes it possible to obtain high forces without increasing the jack cross-section and, for the same load, makes it possible to subdivide the motor currents over each motor, so that there is a significant reduction of the Joule effect losses—in this case if the developed force is limited to that produced by a single motor, the efficiency of the jack is significantly improved, no matter whether it is in the electrical energy receiving phase or the electrical energy generating phase,
static and dynamic force capacity well above the linear motor of the same model,
high dynamic quality as a result of a very linear response of the system in which dry and viscous friction is negligible,
limited electric power requirement in view of the recovery of energy in the case of use in a multiple unit, e.g. a large robot bank,
in the case of use on an electric vehicle with an on-board power supply, the autonomy of the vehicle is increased and, as a result of the energy recovery system, there is a dissipated heat elimination,
with several motors in parallel, there is a redundancy with respect to the operation of the device, which is a use advantage with respect to air and space equipments.

In conclusion, the jack according to the invention is a compact and simple system without any reduction gear, which gives high transient and maintaining forces, taking account of the model of the jack, whilst offering an interesting compromise between a high cut-off frequency due to the rigidity of the balls or roller screw and a very high reversibility and energy efficiency.

The increase in the number of motors makes it possible to obtain high forces without changing the cross-section of the jack and, for an identical load, reduces the losses by the Joule effect, thus contributing to an improvement of the efficiency in the transient phases.

Numerous applications are envisaged, for example:
autonomous robots of the walking type or with dynamically controlled suspension,
flight controls or simulators, advantageously replacing certain hydraulic jacks,
autonomous electric vehicles with automatically controlled suspension,
automatically controlled positioning of sighting or firing equipment on armed, mobile vehicles.

I claim:

1. An electric jack comprising:
a rotation-translation movement transformation system, at least one electric motor (9) for rotating a rotation part in said movement transformation system, means (10) for the control of the electric motor (9) for driving the movement transformation system with acceleration and deceleration phases, energy recovery means for recovering electrical energy generated by the electric motor (9) during the deceleration phases, and wherein;
said movement transformation system comprises a translation part (4, 27, 44) and said rotation part (2) and wherein the movement transformation system is mechanically reversible in that during the deceleration phase, the translation part is capable of rotating the rotation part and the motor (9), which substantially converts the kinetic energy accumulated in the translation part during the translation phase into electrical energy, which is recovered by the energy recovery means.

2. The electric jack according to claim 1, wherein the rotation-translation movement transformation system further comprises a ball nut-screw system (2, 4, 27, 42, 44) wherein the screw (2, 42) has a pitch angle which exceeds 5° to permit the energy recovery.

3. The electric jack according to claim 2, wherein the screw (2, 42) is a multi-thread screw.

4. The electric jack according to claim 2, further comprising a plurality N of rotary motors (9) for driving the nut (4, 27, 44)-screw (2, 42) system wherein an equal amount of power is distributed to each of the N motors (9), so as to reduce the energy losses by the Joule effect during the transient phases.

5. The electric jack according to claim 4, wherein the motors (9) are of the autosynchronous alternating type with at least one resolver (24, 32, 44) mounted on the screw (2, 42).

6. The electric jack according to claim 5, wherein the stator armatures (6, 29, 46) of the motors (9) are connected in parallel.

7. The electric jack according to claim 2, further comprising a linear guide part (5) connected to the translation part (4, 27, 44) by a floating connection.

8. The electric jack according to claim 2, further comprising an energy recovery system having a diode (15) on the supply line, at least one capacitor (14), connected to the electric power supply, for storing the electric energy supplied by the motors (9) during generating phases and a four quadrant-type power stage (11) in order to permit said energy recovery.

9. The electric jack according to claim 8, further comprising a second diode (16) connected in series with the capacitor (14) on the supply and a switch (17) controlled by the control means (10) for controlling the discharge of the capacitor (14).

10. The electric jack according to claim 2, wherein the screw (2, 42) is rotated by the motors (9).

11. The electric jack according to claim 2, wherein the screw (2, 42) is fixed, the motors (9) being placed around the nut (2, 27, 44) and causing rotation of said nut.

12. The electric jack according to claim 10, wherein the screw (2, 42) is hollow, the motors (9), are positioned within the screw and the stator armatures (6, 29, 46) of the motors (9) are central and fixed to a central tube (45).

13. The electric jack according to claim 12, wherein a cooling fluid circulation is provided in the central tube (45).

14. The electric jack of claim 12, further comprising a cylindrical casing (20, 50) with an opening (22, 52) through which is guided in translation the translation part (4, 27, 44).

15. The electric jack according to claim 1, wherein the movement transformation system further comprises a yoke using inclined ball bearings by friction on a rotary shaft.

16. The electric jack according to claim 1, wherein the movement transformation system further comprises a yoke (64) with rollers (65) rolling by friction on a rotary shaft (62).

17. The electric jack according to claim 16, wherein the inclination of the rollers (65) is variable and actuated by an electric motor (66) controlled by an external control system.

* * * * *